(12) United States Patent
Katoh et al.

(10) Patent No.: US 8,005,566 B2
(45) Date of Patent: Aug. 23, 2011

(54) METHOD FOR MACHINING SLIDE CORE HOLE AND MEASUREMENT/CORRECTION SYSTEM FOR USE IN MACHINING OF SLIDE CORE HOLE

(75) Inventors: Kouichi Katoh, Numazu (JP); Takamasa Itoh, Shizuoka-ken (JP); Tsuyoshi Fujita, Inazawa (JP); Masaru Usui, Gifu (JP)

(73) Assignee: Toshiba Kikai Kabushiki Kaisha, Tokyo-To (JP)

( * ) Notice: Subject to any disclaimer, the term of this patent is extended or adjusted under 35 U.S.C. 154(b) by 870 days.

(21) Appl. No.: 12/026,109

(22) Filed: Feb. 5, 2008

(65) Prior Publication Data

US 2008/0199266 A1    Aug. 21, 2008

(30) Foreign Application Priority Data

Feb. 6, 2007  (JP) ................................. 2007-026912

(51) Int. Cl.
*G06F 19/00* (2006.01)
(52) U.S. Cl. .......................... 700/173; 700/160; 700/193
(58) Field of Classification Search .................. 700/159, 700/160, 169, 172, 173, 174, 176, 182, 186, 700/193, 194, 195, 275; 702/85, 94, 95; 318/567, 568.1, 569; 408/1 R
See application file for complete search history.

(56) References Cited

U.S. PATENT DOCUMENTS

| 5,293,321 | A | * | 3/1994 | Fujita et al. | 700/182 |
| 5,495,430 | A | * | 2/1996 | Matsunari et al. | 703/6 |
| 5,680,317 | A | * | 10/1997 | Watanabe | 700/182 |
| 6,401,004 | B1 | * | 6/2002 | Yamazaki et al. | 700/193 |
| 6,601,484 | B1 | * | 8/2003 | Katoh et al. | 82/1.11 |

FOREIGN PATENT DOCUMENTS

JP    2004-034168    2/2004

OTHER PUBLICATIONS

English Abstract of JP-2004-034168.

* cited by examiner

*Primary Examiner* — Charles R Kasenge
(74) *Attorney, Agent, or Firm* — DLA Piper LLP US

(57) ABSTRACT

A measurement/correction system for use in machining an inclined slide core hole includes means for executing a measurement program which, after machining of an intermediate pocket hole in a mold surface, measures the position of the center of a rod hole in a seating surface of the intermediate pocket and the position of the seating surface of the intermediate pocket. Arithmetic means calculates the coordinates of an actual reference point of the rod hole from the measurements. Correction means compares the measured position of the reference point with the reference point previously set in a machining program, and, if there is an error, rewrites the coordinates of the reference point in the program to the measured coordinates. The corrected machining program is executed with the rewritten reference point in order to carry out machining of the core pocket while expanding the intermediate pocket.

5 Claims, 5 Drawing Sheets

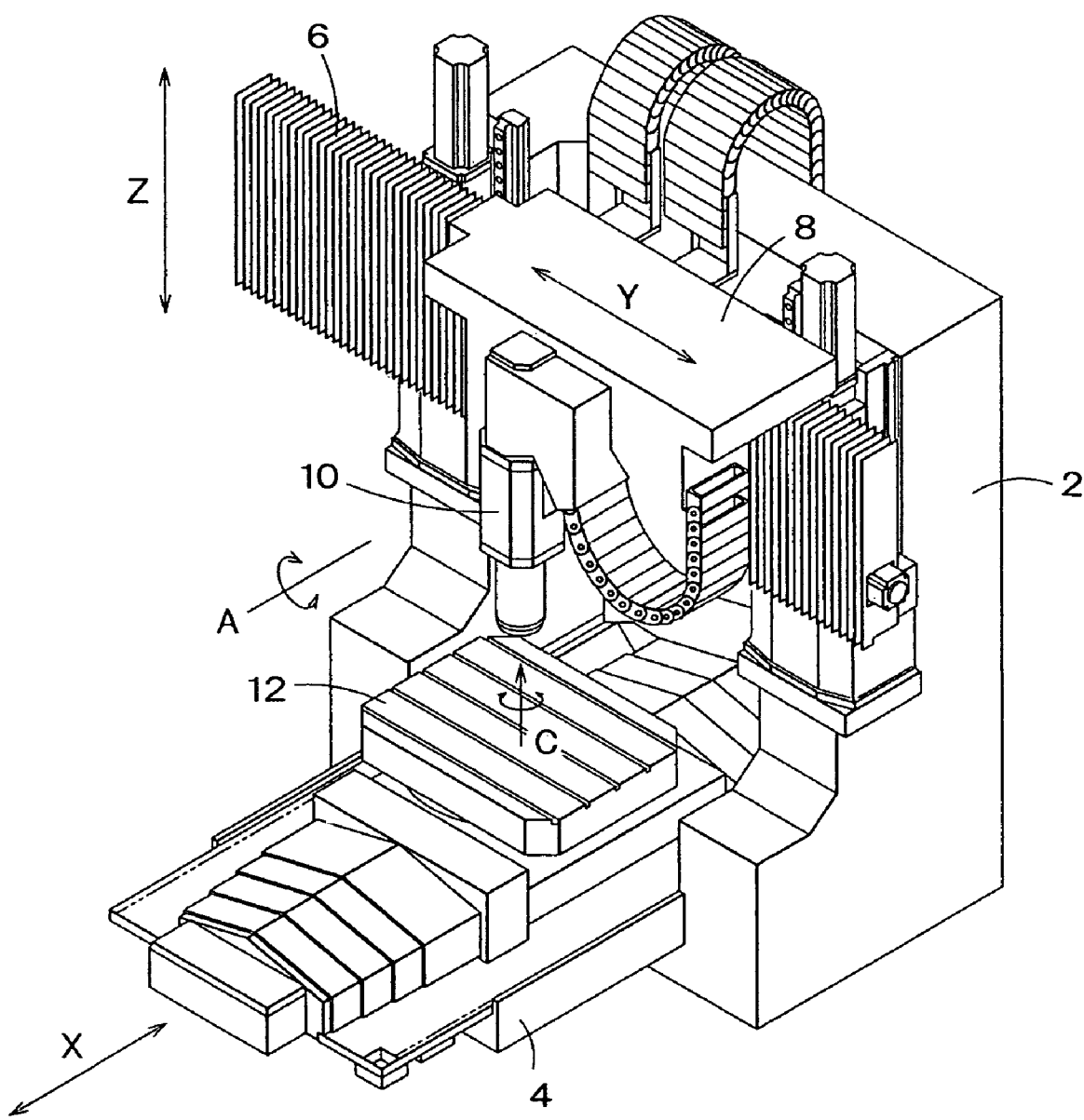
F I G. 1

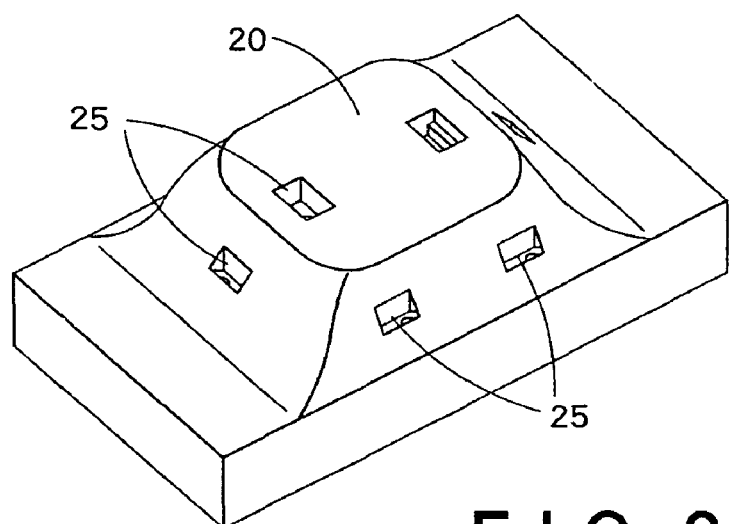
F I G. 2
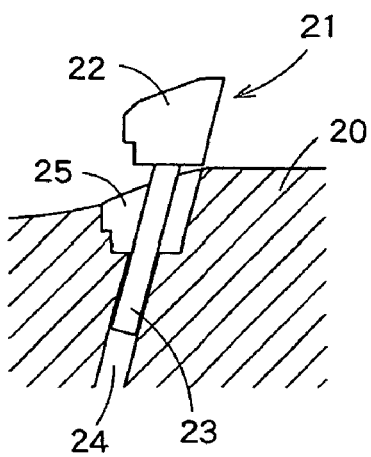
F I G. 3
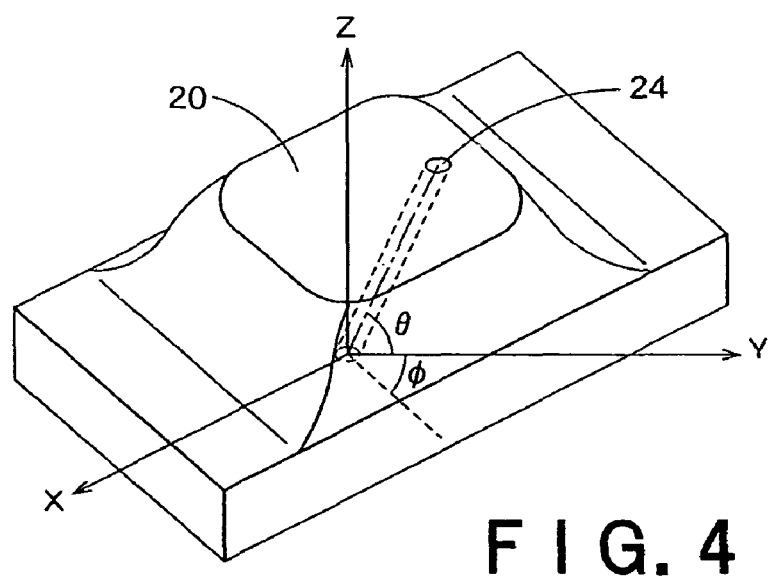
F I G. 4

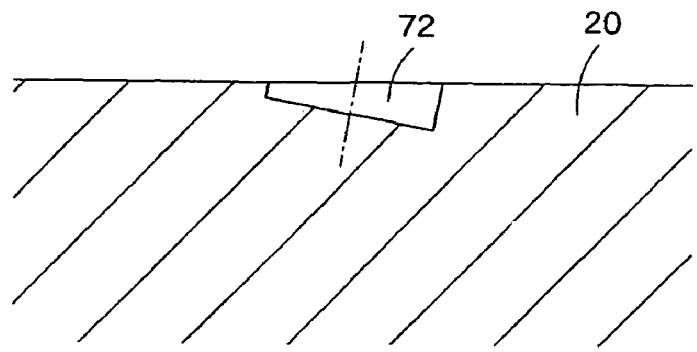
F I G. 6
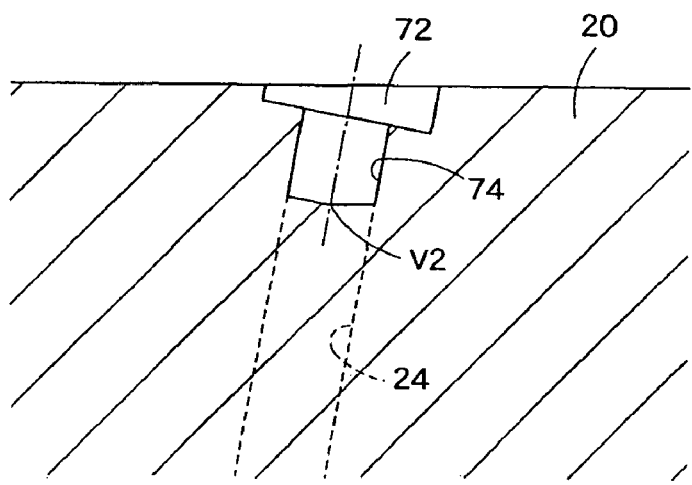
F I G. 7
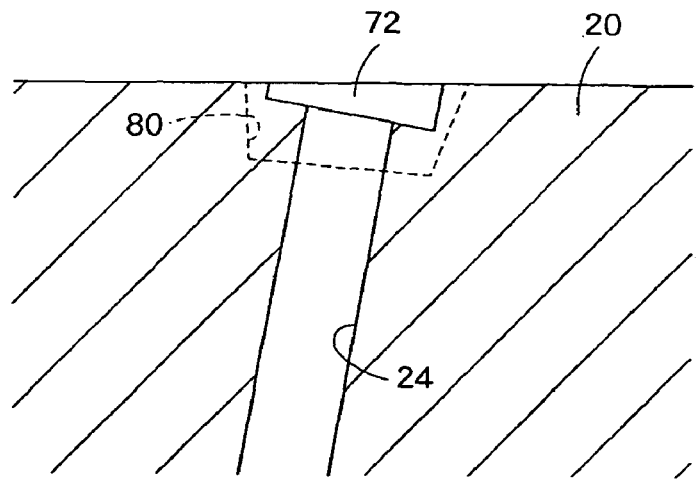
F I G. 8

METHOD FOR MACHINING SLIDE CORE HOLE AND MEASUREMENT/CORRECTION SYSTEM FOR USE IN MACHINING OF SLIDE CORE HOLE

BACKGROUND OF THE INVENTION

1. Field of the Invention

The present invention relates to a method for machining a slide core hole and a measurement/correction system for use in machining of a slide core hole, and more particularly to a technique for machining with a five-axis machine tool an inclined slide core hole for an extrusion pin in a mold for use in molding of a large-sized resin product, such as an instrumental panel or a bumper of an automobile.

2. Background Art

A bridge-type machine tool is conventionally known as a typical five-axis machine tool. A bridge-type machine tool includes a spindle head provided on a cross rail and has, in addition to X-axis, Y-axis and Z-axis, an A-axis for pivoting of the spindle head and a C-axis for indexing of a table. An example of such a bridge-type machine tool is disclosed in Japanese Patent Laid-Open Publication No. 2004-34168. Five-axis machine tools, including the bridge-type machine tool, have been advantageously used for machining of a free-form surface, as typified by machining of a propeller.

These days, the environment surrounding manufacturing industry is changing greatly, and demands by users are also changing. For example, shaping machining of a free-form surface as in value-added machining of a mold has conventionally been the highest priority, and high-speed rotation of a spindle and high-speed following in axial movement have previously been required. To meet the requirements, higher-speed and higher-precision shaping machining with a five-axis machine tool has become realized.

In these days, however, there is a stronger demand by users for a five-axis machine tool that can better perform process-intensive combined machining. While a significant improvement in high-speed, high-precision machining has been achieved as described above, old-fashioned machining operations are still practiced, and the imbalance is becoming a problem.

For example, in machining of a mold for molding a large-sized resin product, such as an instrumental panel or a bumper of an automobile, besides advanced shaping machining, there are many machining operations for which advanced shaping machining is not necessarily required, such as machining of a slide core hole for insertion of an extrusion pin, machining of a cooling cavity, undercut-shaping machining, etc.

Even today when high-speed machining is well-established, machining operations which are in no way high-speed and high-precision machining, such as machining of a slide core hole, are currently practiced in a labor-intensive manner by skilled workers. This is because a number of extrusion pin holes are provided in a mold, and the respective pin holes differ in inclination and azimuth. This is also because an extrusion pin is comprised of an insert portion, to be in contact with a product, and a rod portion, and in conformity with that, a slide core hole is comprised of a combination of two holes which differ in shape and depth, i.e., a core pocket in which the insert is to be housed and a rod hole in which the rod slides.

At present, when machining a slide core hole, machining of a core pocket and machining of a rod hole are generally carried out in separate steps. This often causes a phase misalignment between the core pocket and the rod hole, resulting in poor fitting of an insert into the core pocket. In such a case, machining to correct the core pocket for adjustment of the fitting is practiced manually.

While a core pocket and a rod hole can be machined by utilizing the high-speed cutting performance of a machine tool, an inefficient manual work is forced to be carried out for adjustment of the fitting at the final finish stage. This poses the significant problem that the high-speed cutting performance of a machine tool in shaping machining does not lead to enhanced machining efficiency.

SUMMARY OF THE INVENTION

It is therefore an object of the present invention to provide a method for machining a slide core hole and a measurement/correction system for use in machining of a slide core hole, which solve the above problems in the prior art and enable efficient machining of a slide core hole while utilizing the high-speed cutting performance of a five-axis machine tool.

In order to achieve the object, the present invention provides a method for machining an inclined slide core hole, comprised of a core pocket and a rod hole, in a mold as a workpiece by means of a five-axis machine tool having, in addition to X-axis, Y-axis and Z-axis, an A-axis for pivoting of a spindle head and a C-axis for rotation of a table, said method comprising the steps of: pivoting the spindle head to meet the inclination angle of the slide core hole to be machined in the mold, and fixing the A-axis angle; spot-facing a shallow flat-bottomed spot-faced hole in the surface of the mold by using an end mill as a tool; drilling a guide hole in the bottom surface of the spot-faced hole by using a drill or a reamer as a tool; drilling said rod hole by using a gun drill as a tool with the guide hole as a guide for the gun drill; carrying out, as pre-machining before machining of said core pocket, shaping machining to form an intermediate pocket hole while expanding the spot-faced hole by using an end mill as a tool; correcting a reference point for use as a reference in machining of the core pocket based on measurement of the shape of the intermediate pocket; and executing a corrected machining program with the corrected reference point to carry out precision shaping machining of the core pocket while expanding the intermediate pocket by using an end mill as a tool.

The present invention also provides a measurement/correction system for use in machining of an inclined slide core hole, comprised of a core pocket and a rod hole, in a mold as a workpiece by means of a five-axis machine tool having, in addition to X-axis, Y-axis and Z-axis, an A-axis for pivoting of a spindle head and a C-axis for rotation of a table, said system comprising: a probe mounted to the front end of the spindle of the spindle head and having a terminal for contact with a machined surface of the mold; means for reading and executing an uncorrected machining program prepared to execute a series of process steps for machining the slide core hole in the mold with the five-axis machine tool; means for executing a measurement program which, after machining of an intermediate pocket hole in the mold surface where a spot-faced hole is formed, the machining being pre-machining before machining of the core pocket, is to measure with the probe the position of the center of the rod hole in the seating surface of the intermediate pocket and the position of the seating surface of the intermediate pocket; arithmetic means for calculating the coordinates of the actual reference point of the rod hole for use as a reference in machining of the rod hole, based on data on the measurement with the probe carried out by execution of the measurement program; correction means for comparing the measured position of the reference point of the rod hole with the coordinates of a reference point of the rod hole, previously set in the machining program, and, if there is an error, rewriting the coordinates of the reference point on the program to the measured coordinates of the reference point; and means for executing a corrected machining program with the corrected reference point in order to carry out precision shaping machining of the core pocket while expanding the intermediate pocket.

According to the present invention, machining of a slide core hole in a mold, which has conventionally been carried out in a labor-intensive manner by a skilled worker, can be carried out efficiently by utilizing the high-speed cutting performance of a five-axis machine tool and, in addition, all the machining steps can be carried out by NC machining. This can eliminate, for example, adjustment of fitting of an insert into a core pocket, thus achieving a significant improvement in machining efficiency.

Further according to the present invention, measurement in machining of a slide core hole in a mold can be automated and, in addition, the coordinates of a reference point of the hole can be rewritten based on the results of measurement, enabling machining of the hole with higher precision.

BRIEF DESCRIPTION OF THE DRAWINGS

FIG. 1 is a perspective view of a five-axis machine tool for carrying out machining of a slide core hole according to the present invention;

FIG. 2 is a perspective view of a mold in which slide core holes have been machined;

FIG. 3 is a cross-sectional diagram of the mold shown in FIG. 2;

FIG. 4 is a diagram illustrating the inclination angle and the azimuth of a slide core hole;

FIG. 6 is a cross-sectional diagram illustrating spot facing in machining of a slide core hole according to an embodiment of the present invention;

FIG. 7 is a cross-sectional diagram illustrating drilling of a guide hole in machining of the slide core hole according to the embodiment of the present invention;

FIG. 8 is a cross-sectional diagram illustrating drilling of a slide rod hole according to the embodiment of the present invention;

DETAILED DESCRIPTION OF THE PREFERRED EMBODIMENT

Figure 5:
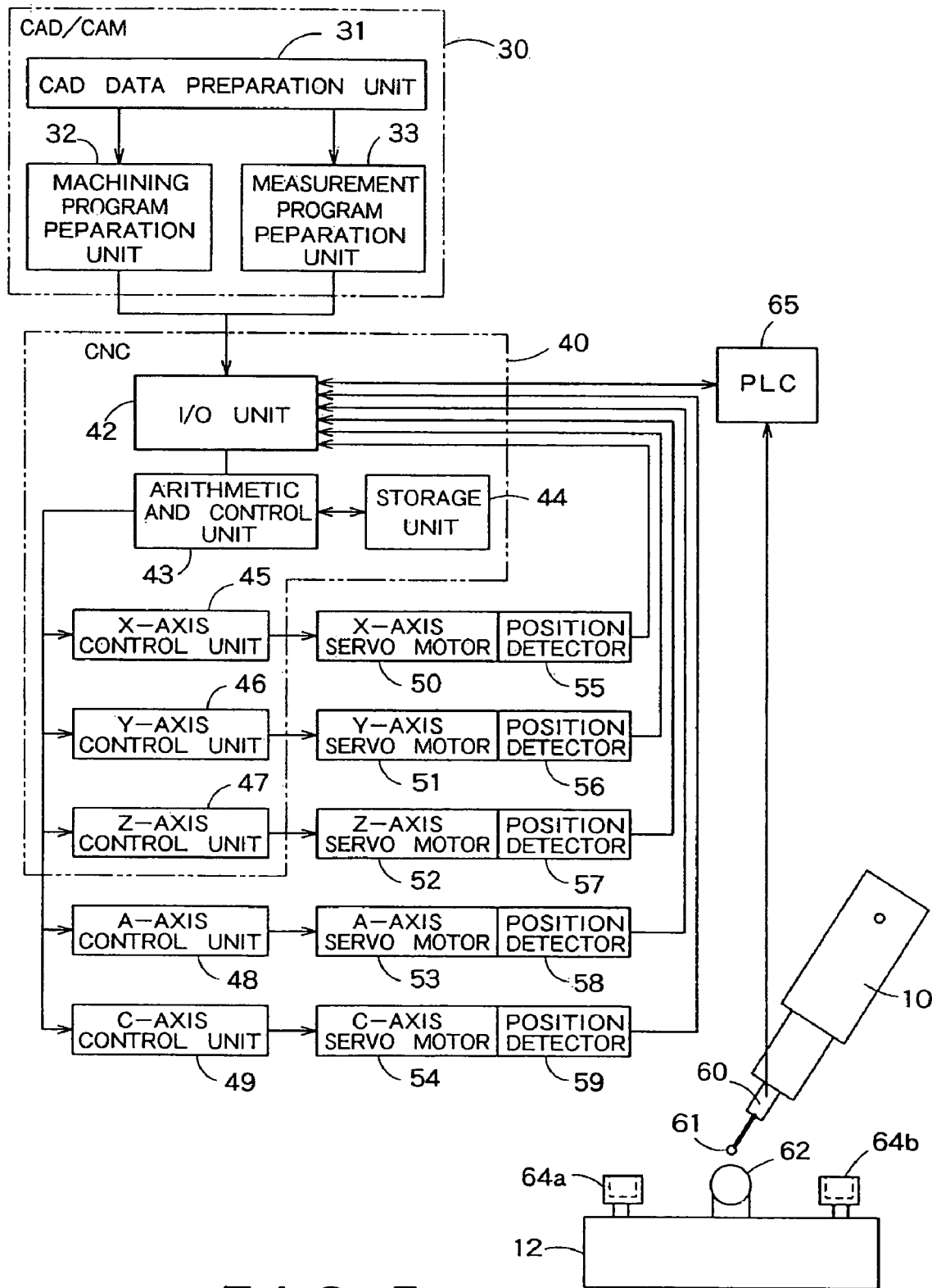
FIG. 5 is a block diagram of a measurement/correction system according to an embodiment of the present invention.

A method for machining a slide core hole and a measurement/correction system for use in carrying out the machining of the slide core hole, according to the present invention, will now be described with reference to the drawings. FIG. 1 shows a bridge-type machine tool, an exemplary five-axis machine tool for use in machining of a slide core hole according to the present invention.

In FIG. 1, reference numeral 2 denotes a pair of columns and reference numeral 4 denotes a bed. A cross rail 6, bridging the columns 2 and extending horizontally, is mounted to the columns 2. The cross rail 6 is designed to be vertically movable. A saddle 8 is horizontally movably mounted to the cross rail 6. A spindle head 10 is pivotably mounted on the saddle 8 and is driven by a swivel pivot mechanism supported by a pivot rolling guide.

A table 12 is provided on the bed 4. The table 12 is a rotary table capable of 360-degree successive rotation, and is capable of turning a workpiece on the table 12 to an arbitrary direction.

Such a bridge-type machine tool has three linear axes, X-axis, Y-axis and Z-axis. The X-axis is a control axis for feeding the table 12 backward and forward, the Y-axis is a control axis for feeding the saddle 8 in the lateral direction, and the Z-axis is a control axis for feeding the cross rail 6 vertically. In addition to the X-axis, Y-axis and Z-axis, the machine tool has an A-axis as a pivot axis for pivoting the spindle head 10 through 30 degrees at the maximum to the right and left in the Y-Z plane, and a C-axis as a rotation axis for rotating the table 12 through an arbitrary angle in a successive manner.

FIG. 2 shows an example of a mold in which slide core holes have been machined by the bridge-type machine tool. What is machined in this embodiment is a large-sized mold 20 for molding a large-sized resin molded product, such as an instrumental panel or a bumper of an automobile. Such a large-sized mold 20 necessitates the use of extrusion pins for taking a molded product out of the mold. A number of extrusion pins need to be inserted into the large-sized mold 20 to take a molded product out of the mold. Accordingly, after carrying out shaping machining of a cavity surface, a number of slide core holes for insertion of extrusion pins are machined in the mold 20.

FIG. 3 is a cross-sectional diagram of the large-sized mold 20. An extrusion pin 21 is comprised of an insert 22 and a slide rod 23, and the insert 22 projects from the mold 20 to extrude a molded product. A slide rod hole 24 in which the slide rod 23 slides and a core pocket 25 in which the insert 22 is to be housed are machined in the mold 20. The slide rod hole 24 and the core pocket 25, as a whole, form a slide core hole.

Such a slide core hole is usually inclined. With respect to one slide core hole, as shown in FIG. 4, the slide core hole can be identified by data on the coordinates of a reference point set for the hole, the inclination angle $\theta$ of the slide core hole, the azimuth $\phi$ of the axis of the slide core hole, etc.

When placing the mold 20 on the table 12 and drilling a slide core hole, the table 12 is rotated so as to meet the azimuth $\phi$ of the slide core hole and the spindle head 10 is kept in a tilted position meeting the inclination angle $\theta$ of the side core hole, and a drill or an end mill is fed while numerically controlling the X-axis, the Y-axis and the Z-axis simultaneously, thereby machining the slid rod hole 24 and the core pocket 25.

It is theoretically possible to formulate a program for machining all the holes to be machined in the mold 20 from data on the coordinates of the reference points of the respective holes and on the inclination angles, azimuths and shapes of the respective holes, and to automate machining of all the holes in the mold 20 by execution of the machining program.

FIG. 5 is a block diagram of a measurement/correction system, applied to the five-axis machine tool, according to the present invention.

In FIG. 5, reference numeral 30 denotes a CAD/CAM machine, and reference numeral 40 denotes a CNC apparatus. The CAD/CAM machine 30 and the CNC apparatus 40 are connected by a communication means, such as serial communication or LAN.

The CAD/CAM machine 30 comprises a CAD data preparation unit 31 for preparing CAD data on a workpiece to be machined, which is the large-sized mold 20 in this embodiment, a machining program preparation unit 32 for preparing a machining program for machining of slide core holes based on data on the positions of the reference points, the inclination angles, the azimuths, the shapes, etc. of slide core holes, contained in the CAD data, and a measurement program preparation unit 33 for preparing, based on the CAD data, measurement programs to perform certain measurements in a series of machining steps for slide core holes, particularly a measurement program to measure the positions of the reference points of slide rod holes 24 after pre-machining of core pockets 25 and a measurement program to measure the shapes of the machined core pockets 25.

The CNC apparatus 40 is a CNC apparatus capable of synchronous five-axis control of X-axis, Y-axis, Z-axis, A-axis and C-axis, and basically comprises an input/output unit 42, an arithmetic and control unit 43, a storage unit 44, an X-axis control unit 45, a Y-axis control unit 46, a Z-axis control unit 47, an A-axis control unit 48, and a C-axis control unit 49.

The arithmetic and control unit 43, besides execution of a machining program, executes a measurement program in a user-specified manner. On execution of these programs, the X-axis control unit 45, the Y-axis control unit 46, the Z-axis control unit 47, the A-axis control unit 48 and the C-axis control unit 49 issue commands for the respective axes, and the commands are outputted to an X-axis servo motor 50, a Y-axis servo motor 51, a Z-axis servo motor 52, an A-axis servo motor 53 and a C-axis servo motor 54, respectively. The actual positions of the respective axes are detected by position detectors 55, 56, 57, 58, 59, and the position detection signals are fed back to the CNC apparatus 40.

When carrying out a measurement by execution of the measurement program, a touch probe 60 is mounted to the front end of the spindle of the spindle head 10. The touch probe 60 is provided with a terminal 61, and an on/off signal, generated upon contact of the terminal 61 with a machined surface of the mold, is inputted via a programmable logic controller 65 into the CNC apparatus 40.

In FIG. 5, the spindle head 10 is in a tilted position with its A-axis angle fixed to meet the inclination angle of a slide core hole to be machined. The spindle head 10 performs machining of the slide core hole while maintaining the tilted position during the machining.

Machining of a slide core hole as carried out with a machining program executed by the CNC apparatus will now be described following the sequence of process steps.

FIG. 6 shows a shallow flat-bottomed spot-faced hole 72 which has been first machined in the surface of the mold 20 using an end mill as a tool. The spot-faced hole 72 is machined by helical machining in such a manner that the hole is expanded while helically moving the end mill. The spot-faced hole 72 may also be machined by plunging while feeding the end mill in the axial direction into the surface of the mold 20. The bottom surface of the thus-machined spot-faced hole 72 is flat. The spot-faced hole 72 has a larger diameter than a hole to be next machined.

FIG. 7 shows the mold 20 in which a guide hole 74 has been drilled from the bottom surface of the spot-faced hole 72. The guide hole 74 is machined, prior to machining of a slide rod hole 24, as a guide hole for a gun drill, and has approximately the same diameter as the diameter of the gun drill. The guide hole 74 is drilled into a predetermined appropriate depth. Instead of a drill, a reamer may also be used for drilling of the guide hole 74.

FIG. 8 illustrates the step of drilling the slide rod hole 24. In the step of drilling of the slide rod hole 24, the front end of the gun drill is caused to approach the guide hole 74 machined in the preceding step and, utilizing the guide hole 74 as a guide, the slide rod hole 24 is drilled into a predetermined depth. After completion of the drilling of the slide rod hole 24, air blowing is carried out to remove chips.

Figure 9:
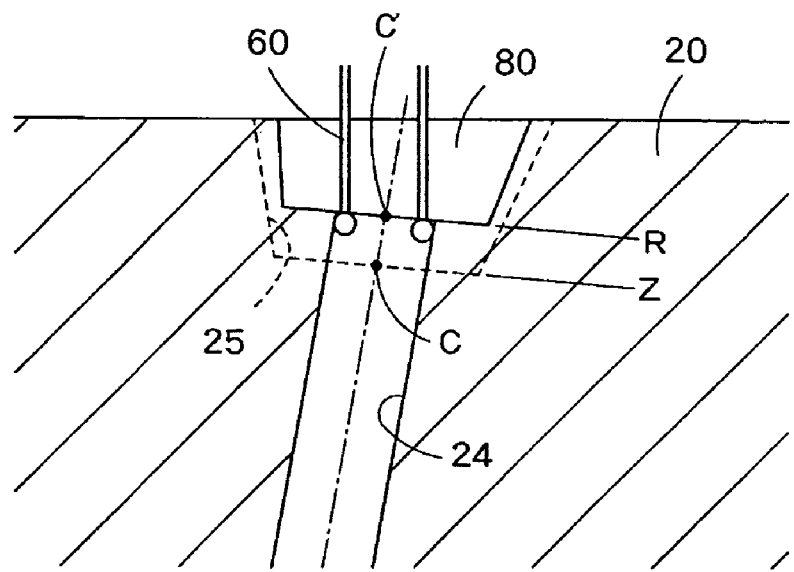
FIG. 9 is a cross-sectional diagram illustrating shaping machining of an intermediate pocket in machining of the slide core hole according to the embodiment of the present invention.

FIG. 9 shows the mold 20 in which an intermediate pocket 80 has been machined after the drilling of the slide rod hole 24. An end mill is used for machining of the intermediate pocket 80.

The intermediate pocket 80 is machined in such a manner as to expand the spot-faced hole 72, and finally machined into a pocket which is shallower and slightly smaller in the overall size as compared to a core pocket 25 to be finished.

After the machining of the intermediate pocket 80, a measurement step is carried out. The touch probe 60 is employed instead of a tool. In FIG. 9, R represents the seating surface of the machined intermediate pocket 80, Z represents the seating surface of the core pocket 25 to be machined, and C' represents the position of the center of the slide rod hole 24 in the X-Y plane in which the seating surface R of the intermediate pocket 80 lies.

In the measurement step, the position of the center C' of the slide rod hole 24 is determined by using the touch probe 60. In particular, while keeping the spindle head 10 in a vertical position, a macro program to measure the center position C' with the touch probe 60 is executed. In the macro program, the coordinates of four contact points between the terminal 61 and the peripheral surface of the slide rod hole 24 are measured, and the coordinates of the center position C' is determined from the measured coordinates of the four points.

By determining the center position C' in the seating surface R of the intermediate pocket 80, the Z-axis value of the seating surface R of the intermediate pocket 80 and the X,Y coordinates of the center position C' can be determined. Since the Z-axis value of the seating surface Z of the core pocket 25 and the inclination angle of the slide rod hole 24 are known, the center position C of the slide rod hole 24 in the seating surface Z of the core pocket 25 can be determined with the seating surface R of the intermediate pocket 80 as a reference plane. The thus-determined center position C of the slide rod hole 24 can be used as a reference point in machining of the core pocket 25.

The above-described reference point C is determined using, as a temporary reference plane, the seating surface R of the intermediate pocket 80 actually machined. Due to an error in machining, however, the reference point C often does not coincide with a design reference point C. A machining program for machining of the core pocket 25 is prepared based on the design reference point C. Therefore, there is a fear that if the processing program is executed as it is to proceed to finish machining of the core pocket 25, the center of the finished core pocket 25 will not coincide with the center of the slide rod hole 24.

Therefore, the arithmetic and control unit 43 compares the results of measurement of the reference point C of the slide rod hole 24 with the coordinates of the design reference point and, if there is an error, rewrites the coordinates of the reference point C set in the processing program to the measured values.

Figure 10:
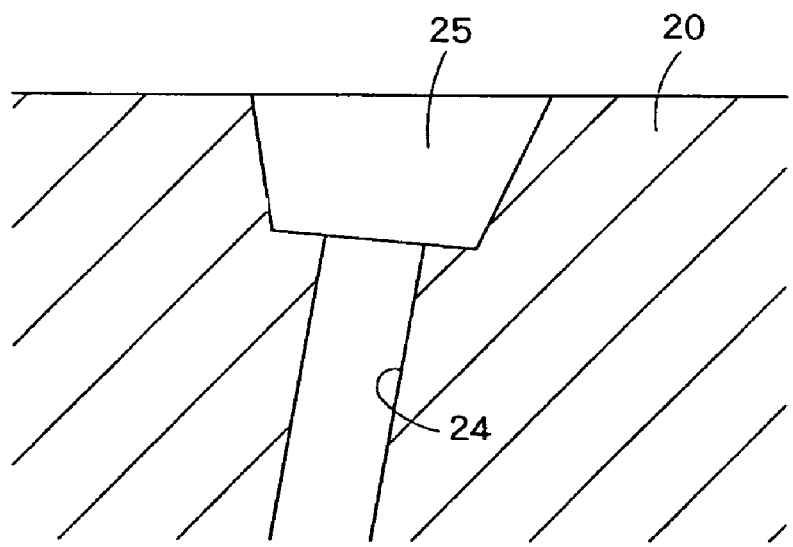
FIG. 10 is a cross-sectional diagram illustrating shaping machining of a core pocket in machining of the slide core hole according to the embodiment of the present invention.

FIG. 10 shows the mold 20 in which the core pocket 25 has been machined. Shaping machining of the core pocket 25 is carried out in two steps: rough machining and finish machining. In the finish machining, the core pocket 25 is machined with precision by executing the processing program with the rewritten coordinates of the reference point.

The finish processing is carried out based on the reference point C to which correction of a possible error has been made through the actual measurement as described above. Accordingly, the center of the core pocket 25 coincides with the center of the slide rod hole 26.

After completion of the finish machining of the core pocket 25, measurement is carried out to measure the inclination angles of the wall surfaces, defining the core pocket 25, and the dimensions of the core pocket 25. In particular, the touch probe 60 is brought into contact with each of the wall surfaces, defining the core pocket 25, to measure the inclination angle of each wall surface and the distance to each wall from the center of the pocket.

The arithmetic and control section 43 has the function of determining, based on the results of the measurement, whether there is a portion left to be machined or there is an over-machined portion, and carrying out re-machining when there is a portion left to be machined or issuing an alarm when there is an over-machined portion. Data on the measurement is stored in the storage unit 44 and fed back to the next machining.

What is claimed is:

1. A measurement/correction system for use in machining of an inclined slide core hole, comprised of a core pocket and a rod hole, in a mold as a workpiece by means of a five-axis machine tool having, in addition to X-axis, Y-axis and Z-axis, an A-axis for pivoting of a spindle head and a C-axis for rotation of a table, said system comprising:
    a probe mounted to the front end of the spindle of the spindle head and having a terminal for contact with a machined surface of the mold;
    means for reading and executing an uncorrected machining program prepared to execute a series of process steps for machining the slide core hole in the mold with the five-axis machine tool;
    means for executing a measurement program which, after machining of an intermediate pocket hole in the mold surface where a spot-faced hole is formed, the machining being pre-machining before machining of the core pocket, is to measure with the probe the position of the center of the rod hole in a seating surface of the intermediate pocket and the position of the seating surface of the intermediate pocket;
    arithmetic means for calculating the coordinates of the actual reference point of the rod hole for use as a reference in machining of the rod hole, based on data on the measurement with the probe carried out by execution of the measurement program;
    correction means for comparing the measured position of the reference point of the rod hole with the coordinates of a reference point of the rod hole, previously set in the machining program, and, if there is an error, rewriting the coordinates of the reference point on the program to the measured coordinates of the reference point; and
    means for executing a corrected machining program with the rewritten reference point in order to carry out precision shaping machining of the core pocket while expanding the intermediate pocket.

2. The measurement/correction system according to claim 1, wherein the machining with the uncorrected machining program comprises the steps of: spot-facing a shallow flat-bottomed spot-faced hole in the surface of the mold by using an end mill as a tool; drilling a guide hole in the bottom surface of the spot-faced hole by using a drill or a reamer as a tool; drilling said rod hole by using a gun drill as a tool with the guide hole as a guide for the gun drill; and carrying out, as pre-machining before machining of said core pocket, shaping machining to form the intermediate pocket hole while expanding the spot-faced hole by using an end mill as a tool.

3. The measurement/correction system according to claim 1, wherein the shaping machining of the core pocket comprises rough machining and finish machining, and after completion of the finish machining, said means for executing the measurement program carries out measurement with the probe to measure inclination angles of wall surfaces, defining the core pocket, and the dimensions of the core pocket.

4. The measurement/correction system according to claim 3, wherein the arithmetic means has the function of determining, based on the results of the measurement, whether there is a portion left to be machined or there is an over-machined portion.

5. The measurement/correction system according to claim 4, wherein the arithmetic means issues an alarm when there is an over-machined portion.

* * * * *